United States Patent
Leow

(10) Patent No.: US 11,995,255 B2
(45) Date of Patent: *May 28, 2024

(54) DYNAMIC MOVING AVERAGING METHOD TO SUPPRESS MOUSE STATIONARY JITTER

(71) Applicant: PixArt Imaging Inc., Hsin-Chu (TW)

(72) Inventor: Chun Heap Leow, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,322

(22) Filed: Jun. 12, 2023

(65) Prior Publication Data

US 2024/0036669 A1 Feb. 1, 2024

Related U.S. Application Data

(63) Continuation of application No. 17/875,436, filed on Jul. 28, 2022, now Pat. No. 11,726,586.

(51) Int. Cl.
*G06F 3/038* (2013.01)
*G06F 3/03* (2006.01)
*G06F 3/0354* (2013.01)

(52) U.S. Cl.
CPC ............ *G06F 3/038* (2013.01); *G06F 3/0304* (2013.01); *G06F 3/03543* (2013.01)

(58) Field of Classification Search
CPC ..... G06F 3/038; G06F 3/0304; G06F 3/03543
See application file for complete search history.

(56) References Cited

U.S. PATENT DOCUMENTS

| 2008/0181526 A1* | 7/2008 | Cheong | G06F 3/038 |
| | | | 382/255 |
| 2016/0004300 A1* | 1/2016 | Baic | G06F 3/0346 |
| | | | 345/419 |

* cited by examiner

*Primary Examiner* — Jonathan A Boyd
(74) *Attorney, Agent, or Firm* — Winston Hsu

(57) ABSTRACT

A method for reducing jitter of an optical sensor when in a stationary condition includes: receiving a plurality of raw delta; comparing a movement of the optical sensor with a predetermined threshold; and when the movement is less than the predetermined threshold, entering a dynamic downshift mode, including: storing raw delta into a buffer; when the buffer is not full, outputting the raw delta as reported delta; and when the buffer is full, calculating an average of the total raw delta stored in the buffer, and outputting the average delta as reported delta.

12 Claims, 3 Drawing Sheets

DYNAMIC MOVING AVERAGING METHOD TO SUPPRESS MOUSE STATIONARY JITTER

CROSS REFERENCE TO RELATED APPLICATIONS

This application is a continuation application of U.S. application Ser. No. 17/875,436, filed on Jul. 28, 2022. The content of the application is incorporated herein by reference.

BACKGROUND OF THE INVENTION

1. Field of the Invention

This invention is directed to mouse jitter, and more particularly, to a method for averaging a reporting delta to suppress jitter of a mouse when in a stationary condition.

2. Description of the Prior Art

A mouse is a computer input device which uses reporting to allow a computer to track its position. An optical mouse contains an optical sensor array and circuitry which allows a visible cursor on a computer screen to move along with movement of the mouse. The optical sensor array works by generating a light from a light source, emitting the generated light to a surface upon which the mouse is placed, and receiving corresponding reflected light, which enables an image of the surface to be acquired. These images will be captured at different intervals, such that when the mouse is moved, delta values corresponding to changes in position of the mouse can be obtained. The delta will be sent to an accumulator within the mouse; the rate at which the information is captured and sent to the accumulator is the frame rate of the mouse.

Current applications such as gaming require a very high frame rate and high resolution in order to accurately reflect movement of a mouse. These very high frame rates and resolution mean that, even when a mouse is stationary, a small amount of delta will still be reported. This will show up on a computer screen as jitter (i.e. the cursor on the screen will have a slight movement), which will be distracting to a user.

There are various prior art methods for solving the above problem. Pseudo Rest discards any delta below a particular threshold, so that zero delta will be reported and a cursor on the computer screen will appear static. When the mouse is accelerated from the static condition, however, the lack of accumulated delta means that an initial movement of the mouse will not be accurately reflected on the computer screen.

DPI Downshift is another related art method which works by actively forcing the mouse sensor to use a lower resolution or DPI (Dots per Index) than the higher resolution typically used for gaming applications. The raw delta will not be discarded as with the Pseudo Rest method described above, but the lower resolution means that the delta will register as zero therefore no jitter will appear on the screen. The disadvantage is that, when the mouse is accelerated from static, the resolution will still be at the lower value, which will affect the speed of the mouse response reflected on the computer screen.

Thus, there is a need for a method which can reduce jitter when a mouse is in a stationary condition while still accumulating received delta during this time. In this way, when the mouse is accelerated from the static condition, movement of the mouse will be accurately reflected on the computer screen.

SUMMARY OF THE INVENTION

This in mind, the invention provides a method for an optical mouse which can solve the problem of jitter when the mouse is in a stationary condition, while still accurately reflecting delta when the mouse is accelerated from the static condition.

According to an exemplary embodiment of the present invention, a method for reducing jitter of an optical sensor when in a stationary condition is disclosed. The method comprises: receiving a plurality of raw delta; comparing a movement of the optical sensor with a predetermined threshold; and when the movement is less than the predetermined threshold, entering a dynamic downshift mode, comprising: storing raw delta into a buffer; when the buffer is not full, outputting the raw delta as reported delta; and when the buffer is full, calculating an average of the total raw delta stored in the buffer, and outputting the average delta as reported delta.

When a movement of the optical sensor is more than the predetermined threshold, the dynamic downshift mode is exited, comprising: not storing the most recent received raw delta into the buffer; summing the most recent received raw delta with all raw delta stored in the buffer; and outputting the sum as reported delta. All raw delta stored in the buffer is then deleted.

Before the dynamic downshift mode is entered, the received raw delta is directly output as the reported delta. The buffer is a four-tap ring buffer, wherein raw delta is stored in the four-tap ring buffer in a first in first out (FIFO) manner.

According to an exemplary embodiment of the present invention, an optical sensor which has reduced jitter when in a stationary condition is disclosed. The optical sensor receives a plurality of frames of raw delta representing movement of the optical sensor, and comprises: a buffer for storing received raw delta when the optical sensor is in a dynamic downshift mode; and a processor, for performing the following steps: comparing a movement of the optical sensor with a predetermined threshold; and entering the dynamic downshift mode when the movement is less than the predetermined threshold, comprising: when the buffer is not full, outputting the raw delta as reported delta; and when the buffer is full, calculating an average of the total raw delta stored in the buffer, and outputting the average delta as reported delta.

The processor exits the dynamic downshift mode when the movement of the optical sensor is more than the predetermined threshold. This comprises: not storing the most recent received raw delta into the buffer; summing the most recent received raw delta with accumulated raw delta stored in the buffer; and outputting the sum as reported delta. The processor further deletes all raw delta stored in the buffer.

Before the optical sensor enters dynamic downshift mode, the received raw delta is directly output as reported delta. The buffer is a four-tap ring buffer, wherein raw delta is stored in the four-tap buffer in a first in first out (FIFO) manner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
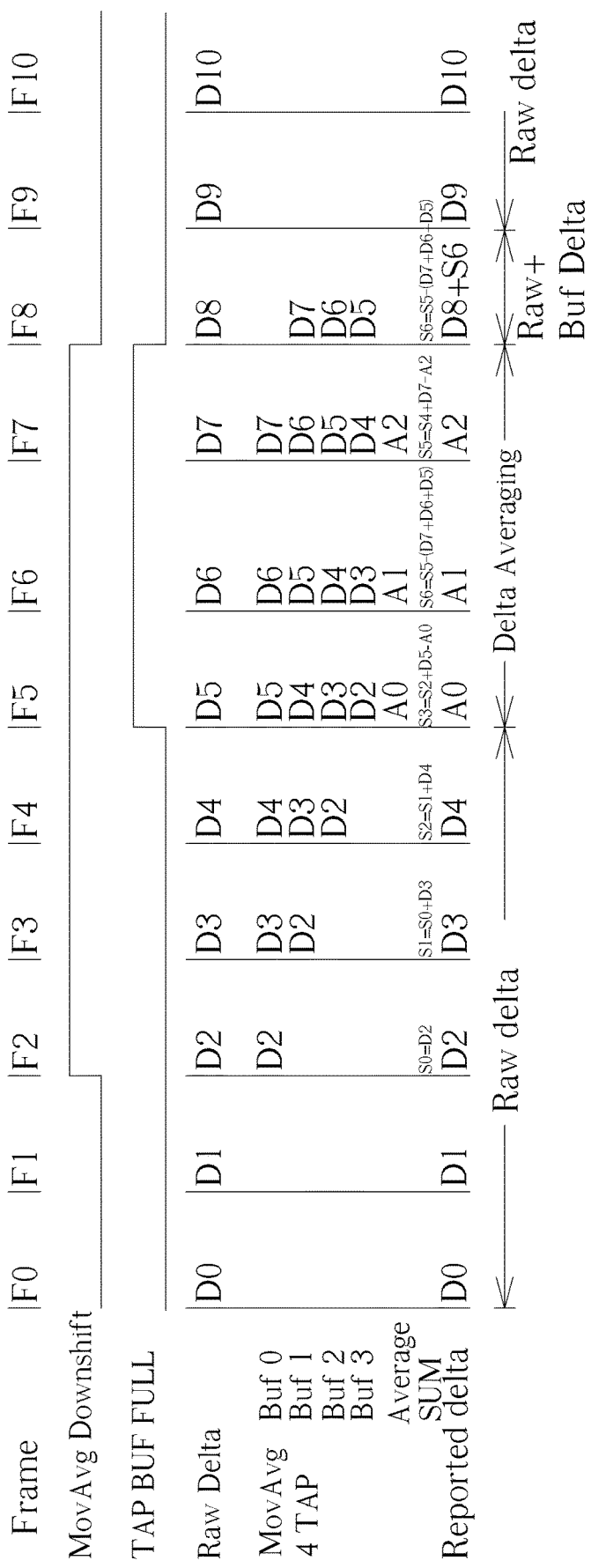
FIG. 1 illustrates signals and delta of a mouse in stationary and non-stationary conditions.

As detailed in the background, gaming applications require a high resolution or DPI in order to accurately reflect small movements of a mouse, which can result in jitter when the mouse is in a largely stationary condition. Rather than discarding delta received while the mouse is in the stationary condition, or lowering the resolution/DPI, the method of the present invention utilizes the stationary condition of the mouse as a trigger to buffer received raw delta.

Before the buffer is full, the received raw delta will directly be output as reported delta, but once the buffer is full, an average of all delta stored in the buffer will be determined and output as reported delta. As will be illustrated in the detailed description and in the accompanying drawings, the average of the stored delta tends to cancel out the delta such that zero delta will be reported and no jitter will be observed on the computer screen.

The buffer is a multi-tap buffer: in a preferred embodiment, it is a four-tap buffer. This buffer is a ring buffer with a total of four spaces/entries. The buffer fills up in a sequential fashion, with each new entry occupying the first space in the buffer, and each previous entry being moved up by one space. Once the buffer is full, a next entry will occupy the first space in the buffer and an earliest entry (i.e. the entry in the last space in the buffer) will be deleted.

The mouse uses two signals to control the above operations. The first control signal is a Moving Average (MovAvg) Downshift signal, which indicates whether the mouse is in a stationary condition. When a frame of detected delta (raw delta) exceeds a predetermined threshold, the mouse is determined to be moving. When a frame of detected delta is below the predetermined threshold, the mouse is determined to be in the stationary condition. At this point, the MovAvg Downshift signal will go high and cause the mouse to enter a Dynamic Moving Averaging mode.

The Dynamic Moving Averaging mode causes the multi-tap buffer in the mouse to store each received frame of raw delta. As detailed above, the multi-tap buffer is a ring buffer which will shift each previous entry by one space when a new entry is stored, and wherein a first entry will be deleted once the buffer is full. When the buffer is full, the second control signal TAP BUF FULL will go high. This instructs a processor of the mouse to calculate the average of accumulated delta in the buffer and output this calculated average as the reported delta.

The method will continue to compare each frame of raw delta with the predetermined threshold to determine whether the mouse remains in the stationary condition or accelerates, i.e. starts to move. When the mouse accelerates from the stationary condition, the MovAvg Downshift signal will go low, which also causes the TAP BUF FULL signal to go low. This means that the next frame of raw delta will not be stored in the buffer. Instead, the raw delta will be added to the total amount of raw delta in the buffer (please note that, as before, the earliest entry will be deleted such that the buffer is not full), and this sum will be output as the reported delta. This reported delta is an accurate representation of the accumulated total movement of the mouse from the stationary condition to the acceleration. For the next frame, all delta in the buffer will be deleted.

Refer to FIG. 1, for a tabular illustration of the above method. A total of 11 frames (F0~F10) is shown in this diagram, wherein a plurality of raw delta D0~D10 respectively corresponding to the frames F0~F10 is received. FIG. 1 shows the two control signals: MovAvg Downshift, and TAP BUF FULL. MovAvg Downshift goes high at frame F2 when the mouse movement goes below a predetermined threshold, i.e. when the mouse is determined to be in a stationary condition. At this point, the raw delta starts to be entered into the buffer, so that raw delta D2 is the first entry in the buffer (Buf 0). A sum S0 of accumulated raw delta is calculated: as there is only one raw delta D2 at this point, the sum of total delta is equivalent to the single received raw delta, i.e. S0=D2. As TAP BUF FULL is still low, the raw delta D2 will be directly output as reported delta.

At frame F3, MovAvg Downshift is still high; D2 is moved to position Buf 1 in the buffer, and raw delta D3 is entered into Buf 0. TAP BUF FULL signal is still low so raw delta D3 is directly output as the reported delta. The sum S1 of accumulated raw delta in the buffer at this point is calculated as S0+D3 (Sum S0 is carried forward and added to the current raw delta d3 to generate sum S1) and no average value is calculated.

For frame F4, D3 moves to position Buf 1, D2 moves to position Buf 2, and raw delta D4 is entered into Buf 0. The previous sum of accumulated delta S1 is added to D4 to generate sum S2. As TAP BUF FULL is still low, no average is calculated and raw delta D4 is directly output as the reported delta.

At frame F5, due to D4 moving to Buf 1, D3 moving to Buf 2, D2 moving to Buf 3, and raw delta D5 being entered into Buf 0, the TAP BUF FULL signal goes high. Rather than outputting the most recent raw delta D5 as the reported delta, an average A0 of the total raw delta in the buffer is determined and output as the reported delta. Further, the sum S3 of the accumulated raw delta in the buffer is determined as S2+D5−A0.

For frames F6 and F7, the MovAvg Downshift signal remains high, meaning that reported delta for both these frames will be the average delta of the total raw delta in the buffer. TAP BUF FULL remains high, so original raw delta in Buf 3 will be deleted, other raw delta will be moved up in a sequential fashion, and the raw delta for a current frame will be entered into Buf 0. The sum of the accumulated raw delta in the buffer will continue to be calculated, and is the sum for a previous frame plus the current raw delta minus the calculated average. Therefore, for F6, sum S4=S3+D6−A1, and for F7, sum S5=S4+D7−A2.

In frame F8, the mouse starts to accelerate from the stationary condition, which will be determined when detected delta of the mouse exceeds the predetermined threshold. At this point, both MovAvg Downshift and TAP BUF FULL go low. This means that raw delta D8 will not be stored in the multi-tap buffer. Delta D5, D6 and D7 will still be shifted in the buffer, such that a sum of accumulated raw delta in the buffer at frame F8 will be calculated as the previous sum (i.e. sum of accumulated delta at frame F7) minus the total amount of delta stored in the buffer at frame F8. This is written as S6=S5−(D7+D6+D5). Reported delta for this frame is D8+S6.

In frames F9 and F10, MovAvg Downshift stays low therefore TAP BUF FULL is also low. It should be noted that all delta previously stored in the buffer is deleted, and reported delta is the received raw delta, i.e. D9 for frame F9 and D10 for frame F10.

Figure 2:
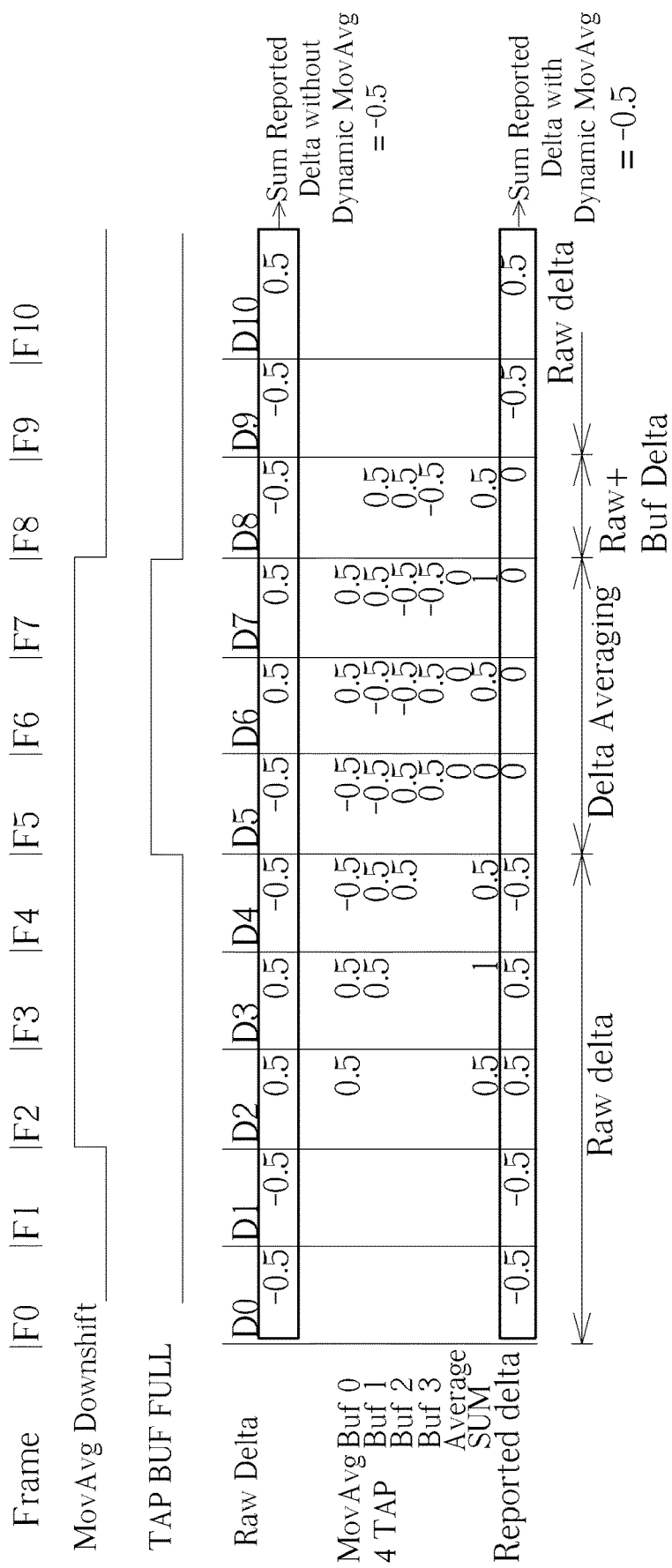
FIG. 2 illustrates delta values of FIG. 1.

Refer to FIG. 2, which illustrates the table shown in FIG. 1 with accompanying values. It should be noted that all values are merely provided to aid understanding. One skilled in the art will appreciate that different values may be received. Values of raw delta are 0.5 or −0.5 in this illustration. In frame F2, D2 is 0.5 and therefore the sum (accumulated) of raw delta in the buffer is also 0.5. In frame F3, D3 is 0.5 meaning the accumulated raw delta in the buffer is 0.5+0.5=1, but the reported delta will be 0.5. In frame F4, D4 is −0.5, so the accumulated raw delta is 1+(−0.5)=0.5, and the reported delta will also be 0.5.

In frame F5, D5 is −0.5. An average A0 of the total raw delta in the buffer is (−0.5+(−0.5)+0.5+0.5)/4=0, and this value will be output as the reported delta. Accumulated delta is 0.5 (previous accumulated data)+(−0.5)−0=0. In frame F6, D6 is 0.5. An average A1 of the total raw delta in the buffer is (0.5+(−0.5)+(−0.5)+0.5)/4=0, and this value will be output as the reported delta. Accumulated delta is 0 (previous accumulated data)+0.5−0=0.5. In frame F7, D7 is 0.5. An average A2 of the total raw delta in the buffer is (0.5+0.5+(−0.5)+(−0.5))/4=0, and this value will be output as the reported delta. Accumulated delta is 0.5 (previous accumulated data)+0.5−0=1.

As can be seen from the above, for frames F5~F7 the MovAvg Downshift and TAP BUF FULL signals are both high. Although a received raw delta is greater than 0 for all frames, the reported delta will be 0, meaning a cursor on a computer screen corresponding to the mouse will appear stationary with no jitter. Further, the buffer stores a value representing an amount of accumulated delta, and this can be reported once the mouse is accelerated from the stationary condition.

In frame F8, MovAvg Downshift goes low which causes TAP BUF FULL to go low also. Received raw delta D8 is −0.5. This value will not be output as reported delta and will also not be stored in the buffer. The buffer therefore only stores three entries corresponding to delta D7, D6 and D5 (0.5, 0.5 and −0.5, respectively). The amount of accumulated delta is calculated as 1−(0.5+0.5+(−0.5))=0.5; this amount is added to the raw delta D8, i.e. 0.5+(−0.5)=0, and this sum will be output as the reported delta.

In frames F9 and F10, the MovAvg Downshift remains low, and all delta stored in the buffer is deleted. Reporting for these frames is the same as for frames F0 and F1, i.e. raw delta is directly output as the reported delta and raw delta is not stored in the buffer.

FIG. 2 shows both the reported delta when the mouse is not in Dynamic Moving Averaging mode (i.e. reported delta is raw delta) and when the mouse is in Dynamic Moving Averaging mode (i.e. reported delta is an average of raw delta in the buffer when the buffer is full). As shown at the top of the table in FIG. 2, the reported delta without Dynamic MovAvg is −0.5, −0.5, 0.5, 0.5, −0.5, −0.5, 0.5, 0.5, −0.5, −0.5, 0.5. As shown at the bottom of the table in FIG. 2, the reported delta with Dynamic MovAvg is −0.5, −0.5, 0.5, 0.5, −0.5, 0, 0, 0, 0, −0.5, 0.5. A total sum of the reported delta both with Dynamic MovAvg mode and without Dynamic MovAvg mode is −0.5.

Figure 3:
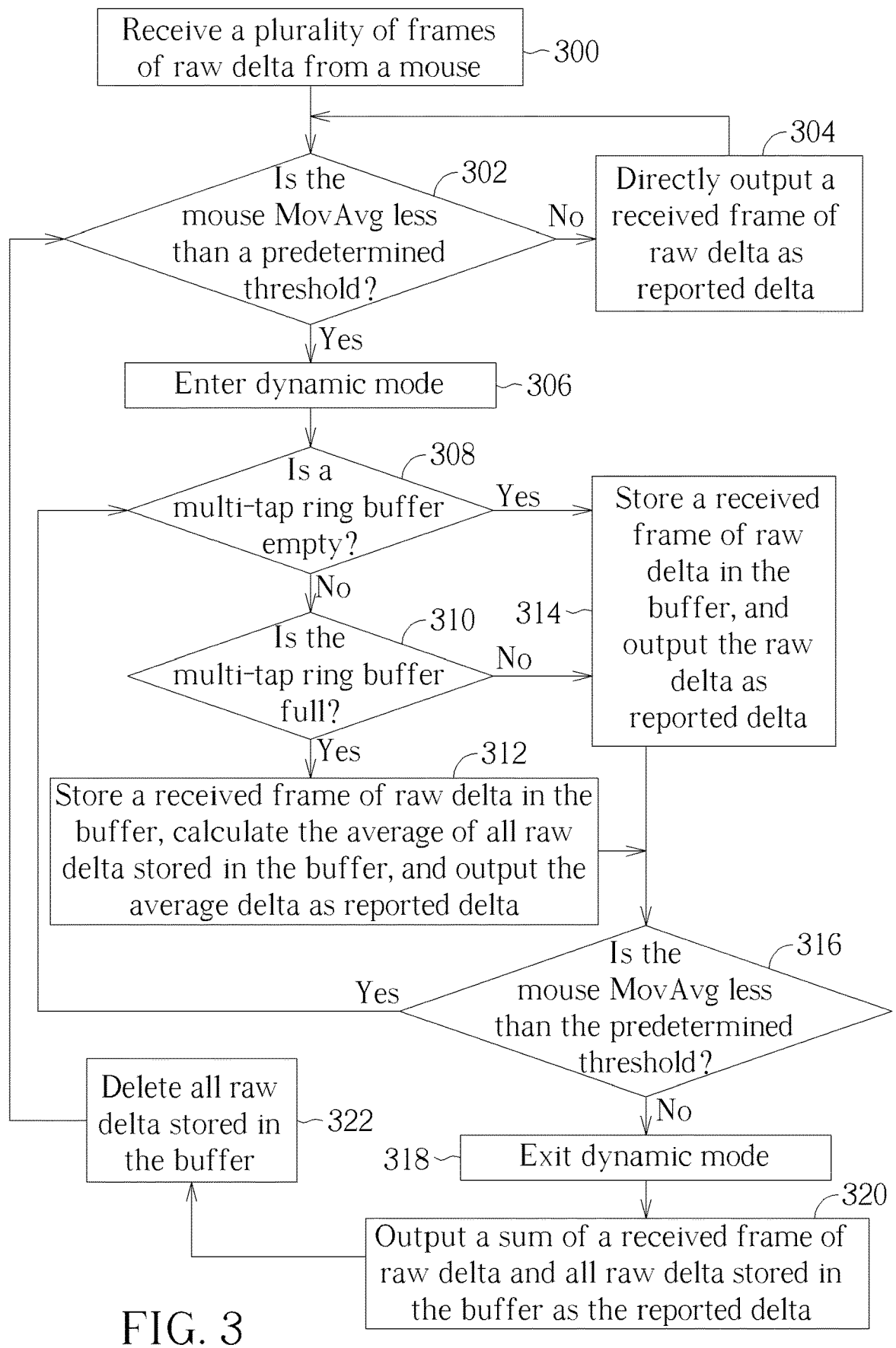
FIG. 3 is a flowchart of the mouse reporting method of the instant application.

FIG. 3 is a flowchart of the method of the present invention. The flow is as follows:

Step 300: Receive a plurality of frames of raw delta from a mouse;

Step 302: Is the mouse MovAvg less than a predetermined threshold? If no, go to Step 304; if yes, go to Step 306;

Step 304: Directly output a received frame of raw delta as reported delta. Return to Step 302;

Step 306: Enter dynamic mode;

Step 308: Is a multi-tap ring buffer empty? If no, go to Step 310; if yes, go to Step 314;

Step 310: Is the multi-tap ring buffer full? If yes, go to Step 312; if no, go to Step 314;

Step 312: Store a received frame of raw delta in the buffer, calculate the average of all raw delta stored in the buffer, and output the average delta as reported delta. Go to Step 316;

Step 314: Store a received frame of raw delta in the buffer, and output the raw delta as reported delta. Go to Step 316;

Step 316: Is the mouse MovAvg less than the predetermined threshold? If yes, return to Step 308; if no, go to Step 318;

Step 318: Exit dynamic mode;

Step 320: Output a sum of a received frame of raw delta and all raw delta stored in the buffer as the reported delta;

Step 322: Delete all raw delta stored in the buffer. Return to Step 302.

In the above description, the multi-tap buffer is a four-tap buffer, but it should be noted that a different multi-tap buffer may be used. As one skilled in the art will understand, it is preferable that a higher tap buffer be used when a high resolution is used, as this will enable the raw delta to easily average out.

In summary, the present invention provides a method which can be implemented by a computer mouse for averaging raw delta when the mouse is in a stationary condition. By reporting averaged delta rather than directly reporting raw delta, an amount of jitter of a cursor on a computer screen can be reduced. Further, the multi-tap buffer can store accumulated delta which can be accurately reported when the mouse is accelerated from a static condition. In this way, jitter of the mouse is reduced while high resolution can be maintained, resulting in a smoother and more comfortable experience for a user without sacrificing a sensitivity of the mouse.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing jitter of an optical sensor when in a stationary condition, the method comprising:
   receiving a plurality of raw delta;
   comparing a movement of the optical sensor with a predetermined threshold; and
   when the movement is less than the predetermined threshold, entering a dynamic downshift mode, comprising:
      storing raw delta into a buffer;
      when the buffer is not full, outputting the raw delta as reported delta; and
      when the buffer is full, calculating an average of the total raw delta stored in the buffer, and outputting the average delta as reported delta.

2. The method of claim 1, further comprising:
   when a movement of the optical sensor is more than the predetermined threshold, exiting the dynamic downshift mode, comprising:

not storing the most recent received raw delta into the buffer; and summing the most recent received raw delta with all raw delta stored in the buffer, and outputting the sum as reported delta.

3. The method of claim 2, further comprising:
deleting all raw delta stored in the buffer.

4. The method of claim 1, wherein before the dynamic downshift mode is entered, the received raw delta is directly output as the reported delta.

5. The method of claim 1, wherein the buffer is a four-tap buffer.

6. The method of claim 5, wherein the four-tap buffer is a ring buffer, and raw delta is stored in the four-tap ring buffer in a first in first out (FIFO) manner.

7. An optical sensor which has reduced jitter when in a stationary condition, wherein the optical sensor receives a plurality of frames of raw delta representing movement of the optical sensor, the optical sensor comprising:
a buffer for storing received raw delta when the optical sensor is in a dynamic downshift mode; and
a processor, for performing the following steps:
comparing a movement of the optical sensor with a predetermined threshold; and
entering the dynamic downshift mode when the movement is less than the predetermined threshold, comprising:

when the buffer is not full, outputting the raw delta as reported delta; and when the buffer is full, calculating an average of the total raw delta stored in the buffer, and outputting the average delta as reported delta.

8. The optical sensor of claim 7, further comprising:
the processor exiting dynamic downshift mode when the movement of the optical sensor is more than the predetermined threshold, comprising:
not storing the most recent received raw delta into the buffer;
summing the most recent received raw delta with accumulated raw delta stored in the; and
outputting the sum as reported delta.

9. The optical sensor of claim 8, wherein the processor further deletes all raw delta stored in the buffer.

10. The optical sensor of claim 7, wherein before the optical sensor enters dynamic downshift mode, the received raw delta is directly output as reported delta.

11. The optical sensor of claim 7, wherein the buffer is a four-tap buffer.

12. The optical sensor of claim 11, wherein the four-tap buffer is a ring buffer, and raw delta is stored in the four-tap ring buffer in a first in first out (FIFO) manner.

* * * * *